(12) United States Patent
Butkus et al.

(10) Patent No.: US 6,982,039 B1
(45) Date of Patent: Jan. 3, 2006

(54) METHOD FOR IMPROVING ULTRAVIOLET RADIATION DISINFECTION OF WATER USING AQUEOUS SILVER

(75) Inventors: Michael A. Butkus, Washingtonville, NY (US); Jeffrey A. Starke, West Point, NY (US); Michael P. Labare, New Paltz, NY (US); Michael B. Kelley, Northfield, VT (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/780,662

(22) Filed: Feb. 19, 2004

(51) Int. Cl.
*C02F 1/50* (2006.01)
(52) U.S. Cl. ..................... 210/748; 210/764
(58) Field of Classification Search ............... 210/748, 210/749, 764
See application file for complete search history.

(56) References Cited

U.S. PATENT DOCUMENTS

| | | | |
|---|---|---|---|
| 5,236,595 A * | 8/1993 | Wang et al. ............ 210/669 |
| 5,342,528 A * | 8/1994 | Adachi et al. .......... 210/668 |
| 6,156,210 A * | 12/2000 | Sadkhin ................. 210/709 |
| 6,267,895 B1 * | 7/2001 | Engelhard et al. ...... 210/748 |
| 6,495,052 B1 * | 12/2002 | Miyamoto et al. ...... 210/764 |
| 6,565,803 B1 | 5/2003 | Bolton et al. |
| 6,602,425 B2 * | 8/2003 | Gadgil et al. .......... 210/744 |
| 6,607,668 B2 * | 8/2003 | Rela .................... 210/321.6 |

OTHER PUBLICATIONS

Agusto Bruni, "The Influence of Exposure of Silver to Ultraviolet Radiation on its Oligodynamic Action on Bacteria" Analli d'Igiene, 1938, 733-742, 42.

R.O. Rahn and L. C. Landry, Ultraviolet Irradiation of Nucleic Acids Complexed with Heavy Atoms-II. Phosphorescence and Photodimerization of DNA Complexed with Ag*, *Photochem. and Photobiolog.* 1973. vol. 18, 29-38, Pergamon Press, Great Britain.

R.O. Rahn and L. C. Landry, Ultraviolet Irradiation of Nucleic Acids Complexed With Heavy Atoms-III. Influence of Ag* and Hg2+ on the Sensitivity of Phage and of Transforming DNA to Ultraviolet Radiation; *Photochem and Photobiolog.* 1973. vol. 18, 39-41, Pergamon Press, Great Britain.

* cited by examiner

*Primary Examiner*—Betsey Morrison Hoey
(74) *Attorney, Agent, or Firm*—Alan P. Klein (57) ABSTRACT

A method of disinfecting water is provided including treating water by irradiating the water with ultraviolet light and introducing silver ions to the water. The water may be treated by either initially irradiating the water with ultraviolet light followed by introducing silver ions to the water or by introducing silver ions to the water and thereafter exposing the silver ion-containing water to ultraviolet light.

14 Claims, 4 Drawing Sheets

METHOD FOR IMPROVING ULTRAVIOLET RADIATION DISINFECTION OF WATER USING AQUEOUS SILVER

BACKGROUND OF THE INVENTION

This invention relates to improvements in methods of decontaminating water. More particularly, the invention relates to methods of disinfecting water using silver and ultraviolet (UV) radiation.

Over the centuries numerous methods have been used to purify water and render it potable. Typically, this involves removal of particulate matter and disinfection of the water. Although sometimes relying on chemical treatment to disinfect pathogens, some small scale water purification systems, such as those used by backpackers, have recently used filters to remove both particulate matter and most biological and chemical contaminants. However, the use of filters to remove biological contaminants has been largely impractical on the scale of a municipal water treatment facility. For that reason, for over a century many large scale water purification systems have used chemical means to remove non-particulate contaminants. Such chemical purification means have sometimes proved to be somewhat ineffective and aesthetically objectionable when applied to large scale purification systems, such as municipal water purification systems.

Chief among the chemical agents used for decontamination of most biological and chemical contaminants has been chlorine. It is readily available and is generally effective for its intended purpose when properly used. However, many consumers have objected to both the odor and taste that chlorine imparts to drinking water when used even within prescribed limits. Chlorine has also been linked to the formation of carcinogens when water containing organic matter is treated. In recent years, chloramine has replaced chlorine at a number of water treatment plants, at least in part because it has a somewhat less objectionable odor and taste than is typically found in water treated with chlorine. However, over the last few decades, because of aesthetic reasons and shortcomings in adequately treating water supplies in several large metropolitan areas in the United States which has resulted in a number of people becoming sick due to pathogens in the improperly processed water, many consumers have installed water treatment devices in their homes or have taken to consuming bottled water. Accordingly, the costs incurred by the public either indirectly in water treatment at the municipal level or directly in obtaining more reliable or less offensive drinking water can be significant.

It has been known since at least 1000 BC that water kept in silver vessels could be made potable. The bactericidal effects of silver have been known since the mid 1800s. Given contact times on the order of hours, silver ions, $Ag^+$, have been shown to be an effective disinfectant against coliforms and viruses. In water, at concentrations sufficient for bactericidal activity, silver ions do not impart taste, color, or odor and have no apparent detrimental effects on mammalian cells. The only known negative health effect is argyria, an irreversible darkening of the skin and mucous membranes, which is caused by prolonged silver therapy.

The mechanisms of the bactericidal activity of silver have been attributed to reactions between silver and both thiol groups and amino acids and the binding of silver to key functional groups in enzymes. Silver has also been shown to inhibit the respiratory chain and inhibit phosphate uptake in *Escherichia coli*.

Silver is not typically used as a large-scale disinfectant in most developed nations, although it is popular in parts of Europe and in some developing nations as a drinking-water disinfectant. It is commonly used to prevent microbial growth in point of use filters, as a co-disinfectant for swimming pool water, which allows for lower chlorine levels in pools, and as a co-disinfectant in hospital hot water systems.

For point of use applications, silver has been impregnated in activated carbon or ceramic filter candles. The desorption of silver from these water purification devices, automatically provides a residual disinfectant effect for users who may not have access to other disinfectants or understand the concept of disinfection and how to determine or measure a safe quantity of disinfectant for potable water. In addition, silver may be useful in potable water storage systems that have long contact times such as cisterns and water storage tanks used in the field by the military.

Two of the principal drawbacks associated with the use of silver as a disinfectant are the need for long contact times and the existence of silver-resistant organisms. Moreover, several reports on the use of silver impregnated water treatment devices suggest that silver provides little benefit as a disinfectant over the life of a typical point of use granular activated carbon (GAC) filter or filter candle. The causes for the reported inability of silver to effectively disinfect water in point of use applications remains largely unreported although silver-resistant bacteria may have been implicated in some cases.

Unlike silver, ultraviolet (UV) radiation is considered a viable process for disinfecting drinking water and wastewater in large-scale water treatment systems because it is an effective means of inactivating pathogens, including bacteria, viruses and protozoa, such as *Cryptosporidium parvum* and *Giardia lamblia*, and it does not create significant disinfection byproducts. As with any disinfection process, an important consideration associated with UV radiation is cost. Power requirements for UV systems are primarily a function of the desired fluence (the product of irradiance and exposure time). In addition to an increase in operating costs, an increase in fluence can also result in a significant increase in capital costs. Microbial inactivation goals, which are a function of a target organism, set the UV design fluence which, for water treatment, can typically vary between 40 $mJ/cm^2$ and 140 $mJ/cm^2$. Fluences as high as 170 $mJ/cm^2$ have been reported for 4-Log (99.99%) inactivation of adenoviruses in tertiary-treated wastewater, which indicates that fluences sufficient for inactivation of coliforms (e.g. ca. 8 $mJ/cm^2$ for *E. coli*) may not provide suitable inactivation of human adenoviruses. Because viruses are reported to be emerging as the pathogens that are most resistant to UV disinfection, they are likely to control the fluence requirements of disinfection processes in many cases. A reduction in the UV design fluence and subsequent capital and operating costs would make UV disinfection more appealing to municipalities who may wish to eliminate disinfection byproducts and improve inactivation of pathogens such as protozoa.

Accordingly, it is an object of the invention to provide a method for improving the disinfection of aqueous systems by inactivation of pathogens, such as bacteria and viruses. It is a further object of the invention to provide an improved method of disinfecting drinking water treatment systems by inactivation of pathogens, such as bacteria and viruses, which will impart no perceptible odor or taste to the water. It is another object of the invention to reduce capital and operating costs of water treatment methods and systems used to inactivate pathogens that employ UV radiation. Additionally, it is an object of the invention to provide an improved method for the disinfection of aqueous systems by inactivation of pathogens, such as bacteria and viruses, which minimizes or eliminates the formation of carcinogens. It is yet a further object of the invention to provide a method for improving the disinfection of aqueous systems by inactivation of pathogens, such as bacteria and viruses, with UV radiation in the presence of silver ion ($Ag^+$).

SUMMARY OF THE INVENTION

The present invention is directed to an enhanced method of disinfecting or inactivating pathogens in small to large scale water treatment systems generally, and drinking water and waste water systems specifically. In the discussion herein, the term "disinfect," and variants thereof, means to destroy pathogenic microorganisms in or on any substance or to inhibit their growth and vital activity. In its broadest usage, the term "inactivate" and variants thereof, as applied to pathogens, may mean either killing a pathogen or preventing a pathogen (most typically a viral pathogen) from replicating and thereby disinfecting the environment in which the pathogen is found. In the discussion herein, this same term, inactivate, and variants thereof, is used to mean both killing and preventing replication, as applied to both non-viral and viral pathogens. Furthermore, in the present discussion, the term "pathogen" and variants thereof, includes bacteria; cyanobacteria; viruses; subviral pathogens, such as viroids and prions; entervirulent *Escherichia coli* group; algae; fungi; and protozoa. The term "fluence" or dose is a measure of the intensity of light or other radiation falling on a surface during a specified period of time, expressed as energy per unit area ($J/cm^2$).

The present invention involves a method of disinfecting water in water treatment systems, both small and large scale, that while effective to inactivate the full range of pathogens that may be present in the water, such as bacteria and viruses, imparts no perceptible odor or taste to the water. In addition, the method of the invention minimizes or eliminates the formation of carcinogens in the purification process, typically formed when water containing organic matter is treated with chlorine. The method of the invention is also much more cost effective compared to other methods and systems of water purification commonly used to inactivate pathogens which involve large capital and operating expenditures for energy or chemical agents.

The aforementioned advantages and attributes of the present invention are realized by a method of treating water to inactivate pathogens, such as in drinking water purification and waste water treatment. More particularly, the present invention inactivates pathogens in an aqueous environment using the combination of ultraviolet irradiation and contact of the pathogen-containing water with silver ions, resulting in a greater inactivating effect than either treatment alone or from the sum of their separate effects. Since the process is significantly more efficient than treatment with UV light alone, a lower fluence is required to achieve inactivation sufficient to meet state and federal regulatory standards for treating drinking water and wastewater, resulting in a lower expenditure of energy and the concomitant costs related thereto.

In its simplest form, the invention inactivates pathogens found in water by a method employing the steps of irradiating the water with ultraviolet light and contacting the water with silver ions. Ultraviolet irradiation may be carried out either prior or subsequent to introducing silver ions to the water being treated.

DETAILED DESCRIPTION OF THE INVENTION

In the method of the invention, the inactivation of pathogens during purification of water, the improvement in the process is obtained by the synergistic combination of introducing silver ions to the pathogen-containing water being treated and exposure of the water to UV radiation.

In combination with appropriate UV radiation, silver ions may be introduced to the water being treated in a particular application by any means suitable to provide a concentration adequate to inactivate the pathogens present. Thus, any source of silver that does not include a toxic anion in the concentrations of $Ag^+$ employed and which results in the formation of $Ag^+$ in aqueous solution in a sufficient concentration to achieve inactivation of pathogens is suitable for use in the present invention. The $Ag^+$ may be introduced in the form of a soluble silver salt either in solid form or in the form of a stock solution of known concentration. If a silver salt is used, silver nitrate is preferred because of its high solubility and relatively low toxicity. Silver nitrate is expected to find most widespread application in preparing small scale water purification apparatus, such as point of use devices, in which active carbon is impregnated with silver nitrate that is thereafter reduced to metallic silver of high surface area. It is believed that in use the carbon acts as a catalyst in the presence of oxygen to cause oxidation of metallic silver to its ionic form which is then desorbed. Depending on the conditions of the water being treated, such as pH etc., other silver materials may be employed and preferred in the process, including the use of silver metal of suitable surface area or an ion exchange resin containing silver ions. In the case of the former procedure, water of suitable pH would be treated by passing it through a fine mesh silver screen or a fine silver powder bed at a very slow rate, possibly recycling the water through the screen or powder bed. In the case of the latter method, water being treated could be passed through the ion exchange column, which column could periodically be withdrawn and regenerated in the silver form. Most preferred, however, particularly for large scale inactivation, such as in municipal drinking water purification and wastewater treatment plants, is electrochemical generation of $Ag^+$. The particular $Ag^+$ concentration and duration of $Ag^+$ presence in the water being treated depends at least in part on the nature and concentration of pathogens present. The $Ag^+$ concentration should be high enough to obtain the desired dose to achieve adequate pathogen inactivation according to the United States Environmental Protection Agency standards and those of the jurisdiction in which the facility is located if the facility is a drinking water purification plant or a wastewater treatment plant. Typically, $Ag^+$ concentrations for water treatment, particularly when drinking water is being treated, are suitably from about 0.001 mg/L to about 10.0 mg/L, preferably about 0.01 mg/L to about 0.5 mg/L and most preferably about 0.08 mg/L to about 0.1 mg/L. These figures relate to "free" silver, that is unbound or uncomplexed silver. In some instances, more often found in the treatment of wastewater, high concentrations of compounds may be present which bind or complex with $Ag^+$. In such cases, additional $Ag^+$ should be introduced into the system to account for the presence of such compounds.

With respect to the duration of contact of the $Ag^+$ with the water, as noted above in the discussion of known methods of treating drinking water with $Ag^+$, except for extremely high $Ag^+$ concentrations (significantly higher than what are proposed here for the present invention), there are no known adverse affects from water containing $Ag^+$. Accordingly, silver may be allowed to remain in the treated water indefinitely. If the silver is removed from the treated water, the minimum duration of contact with drinking water again depends upon the concentration and type of pathogens present. However, in synergistic combination with UV irradiation according to the invention, to achieve adequate pathogen inactivation, the time the silver is present in contact with the water being treated is at least the minimum duration necessary to obtain the desired dose according to the United States Environmental Protection Agency standards and those of the jurisdiction in which the water treatment facility is located. Typically, a suitable time ranges from about 1 minute to about 240 minutes, preferably from about 1 minute to about 30 minutes, and most preferably from about 1 minute to about 5 minutes, varying somewhat with the output of the lamp used. When introduction of silver ion to the water being treated is followed by UV irradiation, inactivation of pathogens does not increase significantly within these ranges. However, when introduction of silver ion to the water being treated is preceded by UV irradiation, inactivation of pathogens increases with longer silver ion contact times within these ranges. Longer silver ion contact times are generally required when UV irradiation precedes exposure to silver ion than vice versa.

Ultraviolet irradiation may be conducted according to the invention using any equipment suitable for the volume of water being irradiated and which can provide a suitable fluence necessary to reduce active pathogen content to an acceptable level for drinking water or waste water purification. Typically this corresponds to the maximum pathogen content standards set by the appropriate governmental agency, such as the United States Environmental Protection Agency or the state agency in which the treatment plant is located.

A suitable UV radiation source is one having a wavelength between about 200 nm to about 300 nm. Preferred is a mercury vapor lamp having a wavelength of about 254 nm. Mercury vapor lamps of either low or medium pressure design may be suitably employed in the invention.

The fluence or dose of UV irradiation to which the water being purified is exposed depends, like the exposure to $Ag^+$, at least in part on the nature and concentration of pathogens present in the water being treated and on the volume of water being treated. The presence of viruses or high concentrations of any pathogen (such as in the treatment of wastewater) typically requires higher fluences. As the data presented in the example set forth below illustrates, the fluence required to inactivate pathogens is less with the method of the invention than with the use of either UV radiation or $Ag^+$ alone or the sum of their separate fluences.

EXAMPLE

Figure 1:
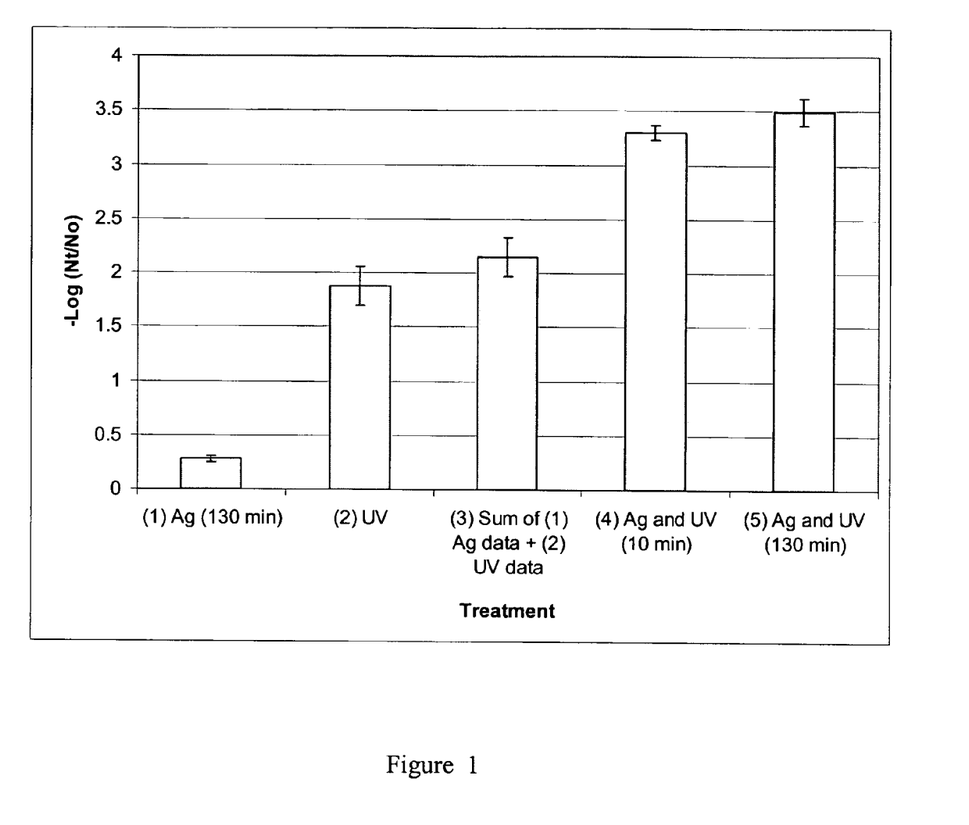
FIG. 1 graphically illustrates inactivation of MS-2 coliphage by silver (0.1 mg/L), UV radiation (ca. 40 $mJ/cm^2$), the arithmetic sum of silver and UV radiation, and combinations of silver and UV radiation in a phosphate buffered solution (pH 7.2).

The data presented below were collected while studying the effects upon inactivation of viruses in an aqueous environment of silver ions and UV radiation, individually, and using the synergistic combination of silver ions and UV radiation according to the invention. In the latter case, irradiation was conducted both before and after virus samples were contacted with silver ion. Thus, FIG. 1 illustrates graphically the inactivation of MS-2 by silver alone (0.1 mg/L) (bar 1), UV radiation alone (target fluence of 40 mJ/cm$^2$ corrected to 37 mJ/cm$^2$ using Petri, sample absorbance, and divergence factors, Bolton et al., vide infra) (bar 2), the arithmetic sum of ((bar 1)+(bar 2)) (bar 3), silver (0.1 mg/L for 10 min) followed UV radiation (ca. 40 mJ/cm$^2$) then neutralized to terminate silver disinfection immediately (10 min total silver exposure) (bar 4), and silver (0.1 mg/L for 10 min) followed UV radiation (ca. 40 mJ/cm$^2$) then neutralized 120 min after exposure to UV (130 min total silver exposure) (bar 5). The difference between bars 3 and 5 was found to be statically significant (p<0.0001). A target fluence of 40 mJ/cm$^2$ was used because it has been proposed as a recommended fluence for water treatment systems. In each of FIGS. 1 to 3, error bars represent one standard deviation. The coliphage MS-2 (hereinafter referred to as "MS-2") was used in this study because it has been proposed as the benchmark for validation of full-scale UV reactors and it is considered a viable surrogate for pathogenic viruses.

Figure 2:
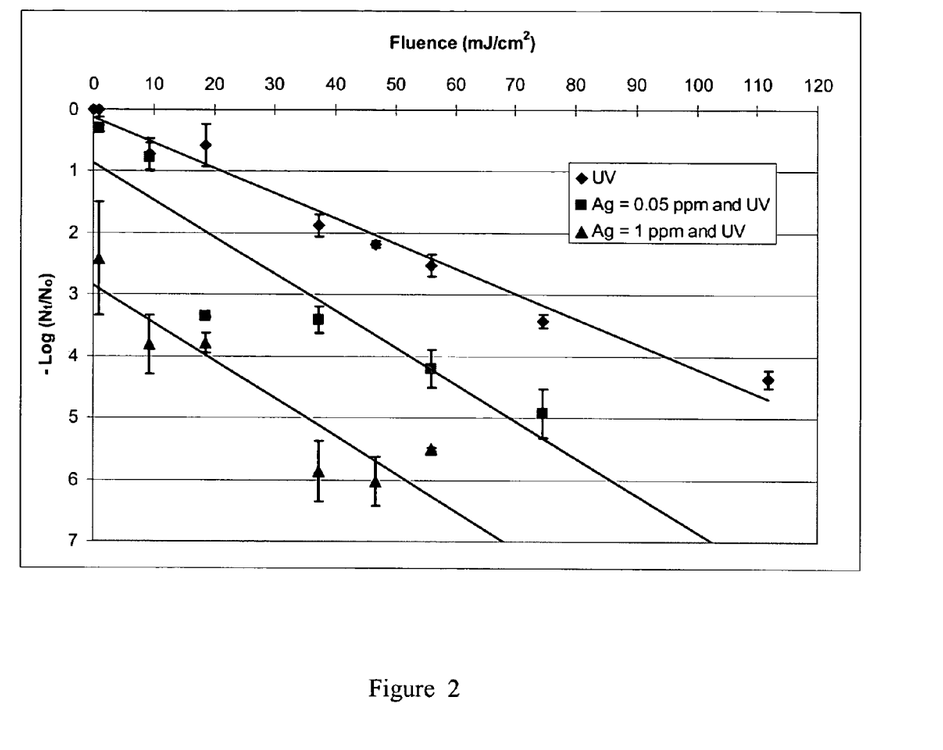
FIG. 2 graphically illustrates inactivation of MS-2 as a function of fluence and silver concentration in a phosphate buffered solution (pH 7.2).
Figure 3:
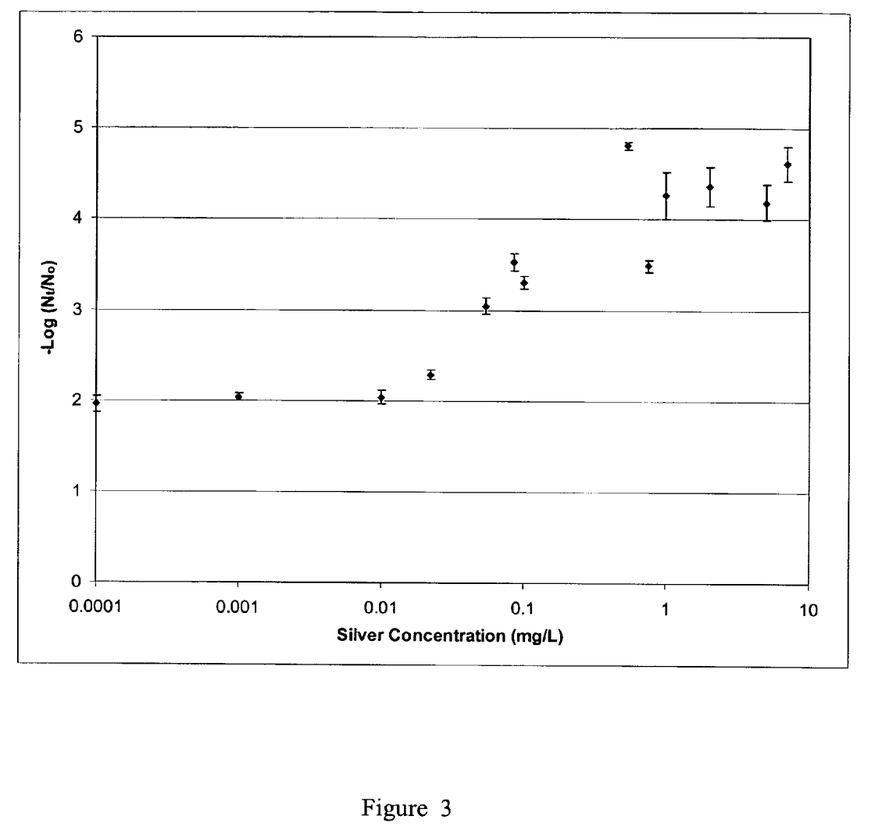
FIG. 3 graphically illustrates inactivation of MS-2 as a function of silver concentration for a fluence of ca. 40 $mJ/cm^2$ in a phosphate buffered solution (pH 7.2).

The variables studied also include UV light dose or fluence (FIG. 2) and silver ion concentration (FIG. 3). FIG. 2 graphically illustrates inactivation of MS-2-containing water samples contacted with silver followed by irradiation as a function of fluence and silver concentration in a phosphate buffered solution (pH 7.2). MS-2-containing samples (0.05 mg $Ag^+$/L or 1 mg $Ag^+$/L) were contacted with cationic silver for 73 minutes including the time required to achieve the specified fluence. Fluence data for UV only (♦) passes through the origin. The lowest fluence data for the samples containing silver in concentrations of 0.05 mg $Ag^+$/L (■) and 1 mg $Ag^+$/L (▲) were 1 mJ/cm$^2$. Regression data are presented in Table 1.

FIG. 3 graphically illustrates inactivation of MS-2-containing water samples contacted with silver followed by irradiation as a function of silver concentration. Silver ion contact (10 minutes) followed by UV irradiation led to a fluence of about 40 mJ/cm$^2$ in a phosphate buffered solution (pH 7.2).

The reagents, procedures employed and results are presented below.

Reagents:

Silver stock solutions were prepared by dissolving a predetermined mass of silver nitrate (Alfa Aesar, Ward Hill, Mass.) in deionized water. Total silver concentration was quantified using a colorimetic procedure (Hatch, Loveland Colo.) with a method detection limit of 0.05 mg Ag/L. Silver neutralizer stock solutions were prepared by combining 11.5 g sodium thiosulfate (J.T. Baker, Phillipsburg, N.J.) and 5.0 g of sodium thioglycolate (Sigma, St. Louis, Mo.) with 50.0 mL of deionized water. Phosphate buffer solutions (20 mM) were prepared by combining 5.678 g of $Na_2HPO_4$ (Fisher Scientific, Fair Lawn, N.J.) with 2 L of distilled water and adding sufficient $NaH_2PO_4$ (Fisher Scientific, Fair Lawn, N.J.) to obtain a pH of 7.2. Phosphate buffer solutions were autoclaved or filter sterilized before use.

Preparation of Purified MS-2:

A culture of *Escherichia coli* (ATCC 15597) was grown in tryptic soy broth (TSB; Difco Laboratories, Detroit, Mich.) at 37° C. and 150 RPM. Freeze dried MS-2 (ATCC 15597-B1) was mixed with 1.5 mL of a 24 hour culture of the host *E. coli* and 3.0 mL of melted (45° C.) TSB soft agar (0.5% agar, w:v). The mixture was overlaid on TSB agar (1.5% agar, w:v) plates and incubated at 37° C. for 24 hours. Six mL of 20 mM phosphate buffer was added to the plate and incubated for 1 hour. The phosphate buffer was removed, passed through a 0.22 $\mu$m filter and the filtrate was used as the MS-2 stock suspension having an initial density of ca. $2 \times 10^8$ plaque forming units (pfu) per mL.

Collimated Beam Setup:

The collimated beam apparatus used (Suntec Environmental, Concord, Ontario, Canada) was modified to hold a stir plate and to allow for easy and reproducible vertical and horizontal adjustment. The sample platform on the instrument was covered with black paper to absorb UV radiation that passed through the sample. The two low-pressure mercury vapor lamps (emitting at a wavelength of 254 nm) in the instrument were warmed up for at least 30 minutes before all experiments were conducted. Lamp intensity was quantified with a UV detector (IL1400A, International Light, Newburyport, Mass.) by placing the detector at the same height as the sample surface. It was determined that variations in lamp intensity across the surface of the samples were negligible by moving the detector in the horizontal plane at distances equivalent to the sample surfaces (vide infra), which resulted in a petri factor (PF) of unity. Fluence was determined by placing the detector in the integration mode following the removal of a shutter and recording the required exposure time. Variations in fluence resulting from drift in lamp output were typically less than ca. 0.5%. However, lamp output was verified periodically during the course of an experiment to compensate for slight changes resulting from drift. The average fluence $$\left(\frac{mW \cdot s}{cm^2}\right) \text{ or } \left(\frac{mJ}{cm^2}\right)$$

and divergence factor (DF=Z/Z+L, where Z=distance from the lamp to the sample surface (cm)) were determined using the method of Bolton, J. R.; Linden, K. G. *J. Environ. Eng.* 2003, 129, 209–215.

Irradiation of Samples:

Samples were prepared by combining 1000±6 $\mu$L of MS-2 viral stock suspensions with 9±0.1 mL (8.9±0.1 mL for samples containing silver) of phosphate buffer in acid-washed, sterile Pyrex glass petri dishes. All samples containing silver ion were prepared such that 100±0.6 $\mu$L of a particular silver stock solution was added to the MS-2 suspensions in the petri dishes to minimize effects of dilution. Samples of MS-2 containing silver ion were maintained at 25±0.1° C. for a predetermined time. The total volume (without stir bar) and depth (with stir bar) of the viral stock suspensions in the petri dishes were 10 mL and 0.6 cm, respectively. The viral stock suspensions were placed under the collimated beam and irradiated for a period sufficient to achieve the predetermined fluence. Samples were stirred slowly to prevent forming a vortex in the water. The time period during which the samples were in contact with silver ion prior to UV radiation was initially 73 minutes. However, it was later determined that there was not a statistical difference (p<0.1534) between samples having silver contact times from 5 minutes to 120 minutes prior to UV irradiation. Consequently, contact periods were shortened. The period during which the MS-2-containing samples were in contact with silver reported herein included the time required to achieve the desired fluence of UV radiation. Samples containing silver were neutralized to terminate silver disinfection following the contact period by adding approximately 10 $\mu$L of the stock neutralizer solution, which was determined to be sufficient for neutralizing the highest silver concentration (10 mg/L) used in this work. Each experiment was conducted at least in triplicate. For all samples, a minimum of three dilutions were plated in triplicate using a standard double agar overlay technique using an *E. Coli* (ATCC 15597) host grown at 37±0.1° C. for 3–6 hours. Plates were maintained at 37±0.1° C. and enumerated at 24±1 hours. The dilution giving the highest number of plaque forming units (pfu) less than 300 was averaged and used to obtain the MS-2 survival. Controls were conducted in triplicate and plated at various times during each experiment to ensure that conditions during the course of an experiment did not influence the number of plaque forming units in the stock suspensions. Log inactivation was calculated as follows $$\text{Log}\left(\frac{N_t}{N_o}\right)$$

where, $N_t$=average pfu in a particular treatment, and $N_o$=average pfu in controls quantified on the same day.

Neutralizer was also added to selected controls to verify that it did not influence MS-2 inactivation.

Results:

Data for inactivation of MS-2 by silver ion (0.1 mg/L), UV radiation (target fluence of 40 $mJ/cm^2$ corrected to 37 $mJ/cm^2$) and combinations of silver and UV radiation are presented in FIG. 1. Considered individually, the samples having contact with silver ions alone for 130 minutes, and samples exposed to UV radiation alone resulted in approximately 0.28-Log (47.52%) and 1.87-Log (98.65%) inactivation, respectively. A measurable inactivation was not observed using a silver ion concentration of 0.1 mg/L only for 10 minutes of contact time. The arithmetic sum of the individual inactivations by silver (for 130 minutes of contact time) and UV radiation is approximately 2.15-Log (99.29%) inactivation (column 3 in FIG. 1). When contact with silver ion was followed by UV radiation, resulting in a total silver ion contact time of 10 minutes, a synergistic effect resulted in ca. 3.30-Log (99.95%) inactivation (column 4). Inactivation increased to ca. 3.49-Log (99.97%) when silver ion was neutralized 120 minutes after exposure to UV radiation, which resulted in a total silver contact time of 130 minutes (column 5). The difference in the data presented in column 3 and column 5 in FIG. 1 was found to be statically significant (p<0.0001). The data clearly show that there is a synergistic effect when silver and UV radiation are combined. The additional inactivation represented by the difference in the data presented in column 4 and column 5 of FIG.

1 is comparable to inactivation by 0.1 mg/L of silver alone (column 1) given the same contact time (130 min).

Inactivation of MS-2 as a function of fluence is presented in FIG. 2. Samples of MS-2 that were first exposed to silver (0.05 or 1 mg $Ag^+$/L) for 73 minutes and then exposed to UV radiation are also presented in this figure. A silver ion contact time of 73 minutes was used here because the influence of contact time on the synergistic effect between silver ions and UV radiation was not initially evaluated. It was later determined that when UV irradiation occurs after silver ion is introduced to the water being treated, silver ion contact time does not influence the synergistic effect, although it does provide additional inactivation by silver ion alone and by silver ion introduction preceded by UV irradiation. Inactivation of MS-2 by 0.05 mg $Ag^+$/L or 1 mg $Ag^+$/L, with 73 minutes of silver ion contact time without UV irradiation, was less than 0.3-Log and 1.2-Log, respectively, which is consistent with data published in the literature for inactivation of MS-2 with silver. The inactivation data for MS-2 exposed to UV radiation, in the absence of silver, is congruent to data reported in the literature.

In order to compare UV data for MS-2 reported in the literature with data in the current study, the data in FIG. 2 were fit with linear functions (Table 1). The slopes for the regression lines through the silver-UV data (Table 1) are slightly greater than for UV alone. Because the y-axis corresponds to silver ion alone, the y-intercept values reported in Table 1 should be a function of the silver ion concentration and the silver ion contact time. The y-intercept values, obtained via linear regression, are somewhat higher than data for silver alone given 73 minutes of contact time (see above), which indicates that the synergistic effect between silver ion and UV radiation was apparent at the lowest fluence evaluated (1 $mJ/cm^2$).

TABLE 1

Regression Analysis for UV Disinfection Experiments Presented in FIG. 2

| Silver Concentration (mg/L) | Slope ($cm^2$/mJ) | y-Intercept | $R^2$ |
| --- | --- | --- | --- |
| 0 | 4.1 × $10^{-2}$ | 0.13 | 0.98 |
| 5.0 × $10^{-2}$ | 6.0 × $10^{-2}$ | 0.87 | 0.83 |
| 1.0 | 6.1 × $10^{-2}$ | 2.85 | 0.84 |

Inactivation of MS-2 as a function of silver ion concentration for a target UV radiation fluence of 40 $mJ/cm^2$ (corrected fluence of 37 $mJ/cm^2$) is presented in FIG. 3. A target fluence of 40 $mJ/cm^2$ was used because it has been proposed as a recommended fluence for water treatment systems. The synergistic effect between silver ion and UV radiation was most sensitive to silver concentration between 0.01 mg/L and 1 mg/L. The 0.01 mg/L and 0.1 mg/L data are different from UV (40 $mJ/cm^2$) at the $p<0.0615$ and $p<0.0001$ levels. There appeared to be no additional inactivation above a silver concentration of 1 mg/L under the conditions evaluated.

Discussion:

By itself, UV disinfection is not very effective at inactivating viruses compared to other organisms. Indeed, a fluence of almost 100 $mJ/cm^2$ was required to achieve a 4-Log inactivation of MS-2 (FIG. 2) while only 1.92 $mJ/cm^2$ may be required to achieve a 4-Log inactivation of *C. parvum* oocysts. However, as illustrated in FIGS. 1 and 2, silver can greatly enhance the effectiveness of UV radiation for inactivation of viruses. At a silver concentration of 0.05 mg/L, which is below the United States Environmental Protection Agency Secondary Drinking Water Standard of 0.1 mg/L, the fluence required to achieve a 4-Log inactivation of MS-2 was reduced by ca. 45% (from 95 $mJ/cm^2$ to 52 $mJ/cm^2$). At about the anticipated regulatory fluence of 40 $mJ/cm^2$, a synergistic effect between silver and WV, at silver concentrations as low as 10 $\mu$g/L, was observed. At the same fluence, an MS-2 inactivation of ca. 3.7-Log (99.97%) was achieved at silver concentration of 0.1 mg/L, a significant improvement over the approximately 1.8-Log (98.42%) inactivation of MS-2 in the absence of silver. About 2-Log inactivation of MS-2 was achieved at a fluence of 20 $mJ/cm^2$ and a silver concentration of 0.05 mg/L.

Unlike silver ion by itself, substantial silver ion contact times are not required to achieve the synergy between silver ion and WV radiation. In fact, a silver ion contact time of 5 minutes prior to WV irradiation provides nearly the same Log inactivation as a silver ion contact time of 120 minutes (FIG. 1). This finding suggests that a large clearwell with a long contact time is not required to obtain the synergistic effect of silver and WV radiation. (A clearwell is a reservoir for storing filtered water of sufficient quantity to prevent the need to alter the filtration process with variations in demand. A clearwell is also used to provide chlorine contact time for disinfection.) Preferably, silver ion (in place of chlorine) should also be used to provide residual disinfection in distribution systems (i.e., the conduits from a drinking water treatment plant) following a silver/UV disinfection process, by simply not removing silver ion from the treated water. Advantages of such an approach are savings in capital and operating costs. Similar advantages and savings may also be realized for processes in which a silver/UV disinfection procedure is followed by the introduction of lower concentrations of chlorine and the elimination of disinfection byproducts, since residual silver ion will allow for much lower residual chlorine concentrations in distribution systems because of the reported synergy between silver and chlorine.

As noted above, the present invention is suitable for use both in continuous processes, such as in drinking water treatment plants and wastewater treatment facilities, and in point of use devices, such as those used to purify small amounts of water, on the scale of several ounces to several gallons in a single application. However, it is expected that the present invention will find most widespread application in the former. Conventional drinking water treatment is accomplished by methods which have been used for hundreds of years. The typical method draws raw water from a supply of surface or ground water and subjects the water to at least one and frequently all of the following processes: flocculation and sedimentation (in which small particles coagulate into larger ones and settle out of the water stream), rapid sand filtration (to remove remaining particles), and disinfection with chlorine (to kill microbes). In municipal drinking water treatment facilities, the method of the present invention is either substituted entirely for the chlorination step or supplements it in part by preceding a more limited chlorination step. If the latter approach is used, silver may be reclaimed prior to chlorination or allowed to remain in solution during chlorination. It has been reported that a synergistic effect exists between silver and chlorine in inactivating pathogens.

Figure 4:
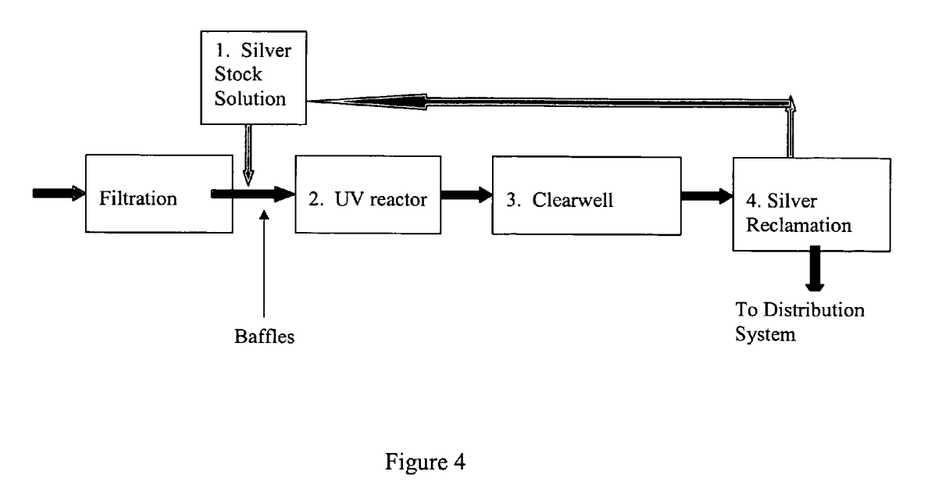
FIG. 4 is a schematic representation of the method of the invention as it is applied to a drinking water treatment plant.

To inactivate pathogens in a large scale facility, such as a drinking water purification plant, the following procedure may be used: A silver ion stock solution, prepared either with silver nitrate or, preferably, electrochemically using silver electrodes, is added at the filter effluent as shown in FIG. 4. The concentration of silver ion is adjusted such that the concentration in the main process train through the UV reactor is less than the United States EPA secondary standard of 0.1 mg Ag/L. This concentration limit is not required if silver is recovered at the clearwell effluent as discussed below. Baffles are placed upstream of the UV reactor to completely mix the silver ion with the water being disinfected. After passing through the baffles, the silver-containing water is conducted through the UV reactors. Since inactivation is largely a function of silver ion concentration and retention time in the UV reactor, operators can optimize system performance by changing either of these variables.

After being exposed to UV radiation, the silver ion-containing water exits the UV reactor and enters the clearwell. Here, additional disinfection occurs due to the presence of silver ion. Chlorine might also be added at this point to increase disinfection. If excess silver is present at the clearwell effluent (i.e. above the USEPA secondary standard), then it may be collected electrochemically via a plating process, ion exchange or activated carbon. The reclaimed silver can then be reused as indicated above.

A similar process as the method described above may be used for wastewater treatment, with some variations. For example, higher silver concentrations may be employed and the duration of exposure to UV radiation may be increased. Except for particular circumstances, if the processed water is to be introduced to a river, bay, or the like, it would generally not be exposed to chlorine and the silver would normally be reclaimed.

It is obvious that many modifications and variations of the present invention are possible in light of the above teachings. It is, therefore, to be understood that within the scope of the appended claims, the invention may be practiced other than as described.

What is claimed is:

1. A method for treating water to disinfect pathogens, including the inactivation of viruses, comprising introducing silver ions to the water and thereafter exposing the silver ion-containing water to ultraviolet light having a fluence of about 1 mJ/cm$^2$ to about 200 mJ/cm$^2$.

2. The method of disinfecting water of claim 1 wherein the ultraviolet light has a wavelength of about 200 nanometers to about 300 nanometers.

3. The method of disinfecting water of claim 1 wherein the ultraviolet light has a wavelength of about 254 nanometers.

4. The method of disinfecting water of claim 1 wherein silver ions are present as silver nitrate.

5. The method of disinfecting water of claim 1 wherein silver ions are left to remain in the treated water.

6. The method of disinfecting water of claim 1 wherein silver ions are removed from the treated water.

7. The method of disinfecting water of claim 1 wherein the water being treated is drinking water.

8. The method of disinfecting water of claim 1 wherein the water being treated is waste water.

9. The method of disinfecting water of claim 1 wherein the concentration of silver ions in the water is about 0.001 mg/L to about 10.0 mg/L.

10. The method of disinfecting water of claim 1 wherein the concentration of silver ions in the water is about 0.01 mg/L to about 0.5 mg/L.

11. The method of disinfecting water of claim 1 wherein the concentration of silver ions in the water is about 0.08 mg/L to about 0.1 mg/L.

12. The method of disinfecting water of claim 1 wherein the silver is introduced to the water using electrochemical generation.

13. The method of disinfecting water of claim 1 wherein the silver is introduced to the water using a silver-containing ion exchange column.

14. The method of disinfecting water of claim 1 wherein in addition to a virus, the water being treated contains at least one pathogen selected from the group consisting of bacteria, cyanobacteria, subviral pathogens, entervirulent *Escherichia coli* group, algae, fungi, and protozoa.

* * * * *